(12) United States Patent
Wadsworth

(10) Patent No.: US 10,632,687 B2
(45) Date of Patent: Apr. 28, 2020

(54) METHOD AND ASSEMBLY FOR BONDING COMPLEX COMPOSITE ASSEMBLIES

(71) Applicant: SPIRIT AEROSYSTEMS, INC., Wichita, KS (US)

(72) Inventor: Mark Anthony Wadsworth, Sedan, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 491 days.

(21) Appl. No.: 15/387,972

(22) Filed: Dec. 22, 2016

(65) Prior Publication Data
US 2018/0179989 A1    Jun. 28, 2018

(51) Int. Cl.
| | | |
|---|---|---|
| B29C 65/70 | (2006.01) | |
| B29C 39/10 | (2006.01) | |
| B29C 35/02 | (2006.01) | |
| F02K 1/72 | (2006.01) | |
| B29K 21/00 | (2006.01) | |
| B29K 105/00 | (2006.01) | |
| B29L 31/30 | (2006.01) | |

(52) U.S. Cl.
CPC ............ B29C 65/70 (2013.01); B29C 39/10 (2013.01); F02K 1/72 (2013.01); B29C 35/02 (2013.01); B29K 2021/00 (2013.01); B29K 2105/251 (2013.01); B29L 2031/3076 (2013.01); F05D 2230/22 (2013.01); F05D 2240/129 (2013.01); F05D 2300/501 (2013.01); F05D 2300/603 (2013.01); Y02T 50/672 (2013.01)

(58) Field of Classification Search
CPC ................................................ B29C 48/2665

USPC ........................................................ 156/242
See application file for complete search history.

(56) References Cited

U.S. PATENT DOCUMENTS

| | | | | |
|---|---|---|---|---|
| 4,755,341 A | * | 7/1988 | Reavely | ............... B29C 43/10 264/102 |
| 4,983,341 A | * | 1/1991 | Kromrey | ............ B29C 43/3642 264/102 |
| 5,782,082 A | * | 7/1998 | Hogeboom | ............. F02C 7/045 181/213 |

(Continued)

OTHER PUBLICATIONS

"Tooling." CompositesWorld. Available Mar. 23, 2016. <https://www.compositesworld.com/articles/tooling> (Year: 2016).*

Primary Examiner — Matthew J Daniels
Assistant Examiner — Hana C Page
(74) Attorney, Agent, or Firm — Hovey Williams LLP

(57) ABSTRACT

A tooling assembly and method for bonding composite components together, such as a bonded cascade assembly of a thrust reverser for an aircraft nacelle. The method may include the steps of fixing composite turning vanes between elongated stiffeners, placing them in a cavity formed by a tooling frame, then filling cavities between the turning vanes, the elongated stiffeners, and/or the tooling frame with flowable solid elastomeric material. The method may also include the steps of compressing and/or heating the elastomeric material, the turning vanes, the elongated stiffeners, and the tooling frame. This heat and/or pressure combined with expansion of the elastomeric material may be sufficient to press contacting portions of the turning vanes and the elongated stiffeners toward each other and also causing the turning vanes to bond to the elongated stiffeners under pressure of the elastomeric material expansion.

15 Claims, 13 Drawing Sheets

(56) References Cited

U.S. PATENT DOCUMENTS

| | | | | |
|---|---|---|---|---|
| 6,197,146 | B1* | 3/2001 | Sucic | B29C 43/184 |
| | | | | 156/245 |
| 7,923,668 | B2* | 4/2011 | Layland | B64D 15/12 |
| | | | | 219/529 |
| 8,940,213 | B2* | 1/2015 | Lockett | B29C 37/0085 |
| | | | | 264/257 |
| 9,895,840 | B2* | 2/2018 | Bartel | B29C 70/342 |
| 2010/0239856 | A1* | 9/2010 | Olson | B29C 70/465 |
| | | | | 428/339 |
| 2019/0084683 | A1* | 3/2019 | Schwoller | B64C 11/001 |

* cited by examiner

METHOD AND ASSEMBLY FOR BONDING COMPLEX COMPOSITE ASSEMBLIES

BACKGROUND

Most commercial jet aircraft engines employ thrust reversers to aid in stopping the aircraft during landing. Aircraft with under-wing-mounted engines typically use a translating sleeve cascade thrust reverser that includes an outer sleeve covering a fan duct portion of the engine. The outer sleeve translates in an aft direction, dropping down a series of doors to block fan duct air and, in sequence, exposing a series of cascades or turning vanes that redirect the fan duct air outward and forward to reverse the thrust of the engine. The cascades may also feature side tuning flow geometry to prevent hot fan duct air impingement onto critical aircraft structures. The cascades may be grouped and fixed together in several cascade baskets or assemblies.

The individual cascade baskets are positioned radially around the engine's nacelle and are mounted to a fixed structure of the thrust reverser via a forward and aft mount or attach ring. Some cascade baskets are made from composite materials, which are generally lighter and more durable than conventional metal cascade baskets, but generally require a labor intensive fabrication that is more expensive than fabricating traditional metal cascade baskets.

Accordingly, there is a need for improved methods and assemblies for fabricating cascade thrust reversers.

SUMMARY

Embodiments of the present invention provide a method for bonding complex composite assemblies, such as a bonded cascade assembly of a thrust reverser for an aircraft engine nacelle. One embodiment of the method includes the steps of fixing a plurality of composite components in contact with each other and placing the composite components within a tooling frame. Then the method may include the steps of filling cavities between or otherwise formed into the composite components with flowable solid elastomeric material and compressing the elastomeric material, the composite components, and the tooling frame. This compression due to the flow of the elastomeric material into the cavities may be sufficient to press the composite components toward each other and may cause the composite components to bond to each other under pressure of the elastomeric material pressure.

Other embodiments of the invention provide a method of bonding multiple components of a bonded cascade assembly of an aircraft nacelle, and may include the steps of fixing a plurality of turning vanes between a plurality of elongated stiffeners with adhesive, then placing the turning vanes and the elongated stiffeners within a tooling frame. The turning vanes and the elongated stiffeners may be made of composite material. Next, the method may include the steps of filling cavities formed between the turning vanes and the elongated stiffeners with flowable solid elastomeric material and compressing and heating the elastomeric material, the turning vanes, the elongated stiffeners, and the tooling frame. This heating causes expansion, which in combination with the flow of the elastomeric material into the cavities, is sufficient to press contacting portions or bondlines of the turning vanes and the elongated stiffeners toward each other, causing the turning vanes to bond to the elongated stiffeners under pressure of the elastomeric material expansion.

Yet another embodiment of the invention is a tooling assembly to bond composite components of a cascade thrust reverser of an aircraft engine nacelle, thereby forming a bonded cascade assembly. The bonded cascade assembly formed by the tooling assembly may comprise a structural frame having a plurality of elongated stiffeners and a plurality of turning vanes fixed between the elongated stiffeners of the structural frame. The tooling assembly includes a tooling frame, a pressure distribution plate, and a pressure-inducing apparatus. The tooling frame may have one or more side walls and a bottom wall with a curvature corresponding to a curvature of the bonded cascade assembly. The tooling frame may also have a plurality of heat transfer fins extending from the bottom wall and a plurality of indexing protrusions or indentions extending from or formed into the bottom wall of the tooling frame, for maintaining a desired spacing of turning vanes of the bonded cascade assembly. The pressure distribution plate may be made of a rigid material and may have a plurality of holes formed therethrough, as well as a plurality of grooves or protrusions positioned for alignment relative to the elongated stiffeners of the bonded cascade assembly. The pressure-inducing apparatus may be moveably located within the tooling frame to be pressed or compressed in a direction toward the bottom wall of the tooling frame, thus providing pressure to compress elastomeric material, providing pressure to assist in bonding the elongated stiffeners and turning vanes.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 12:
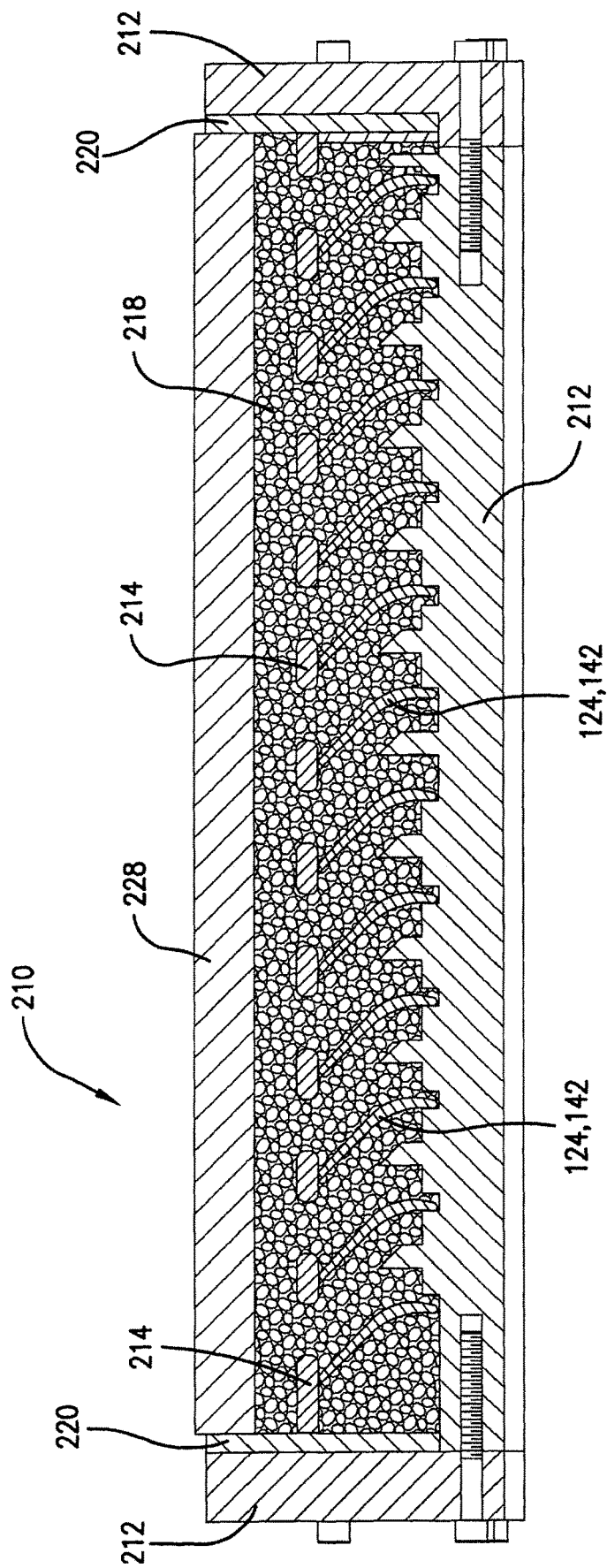
Figure 13:
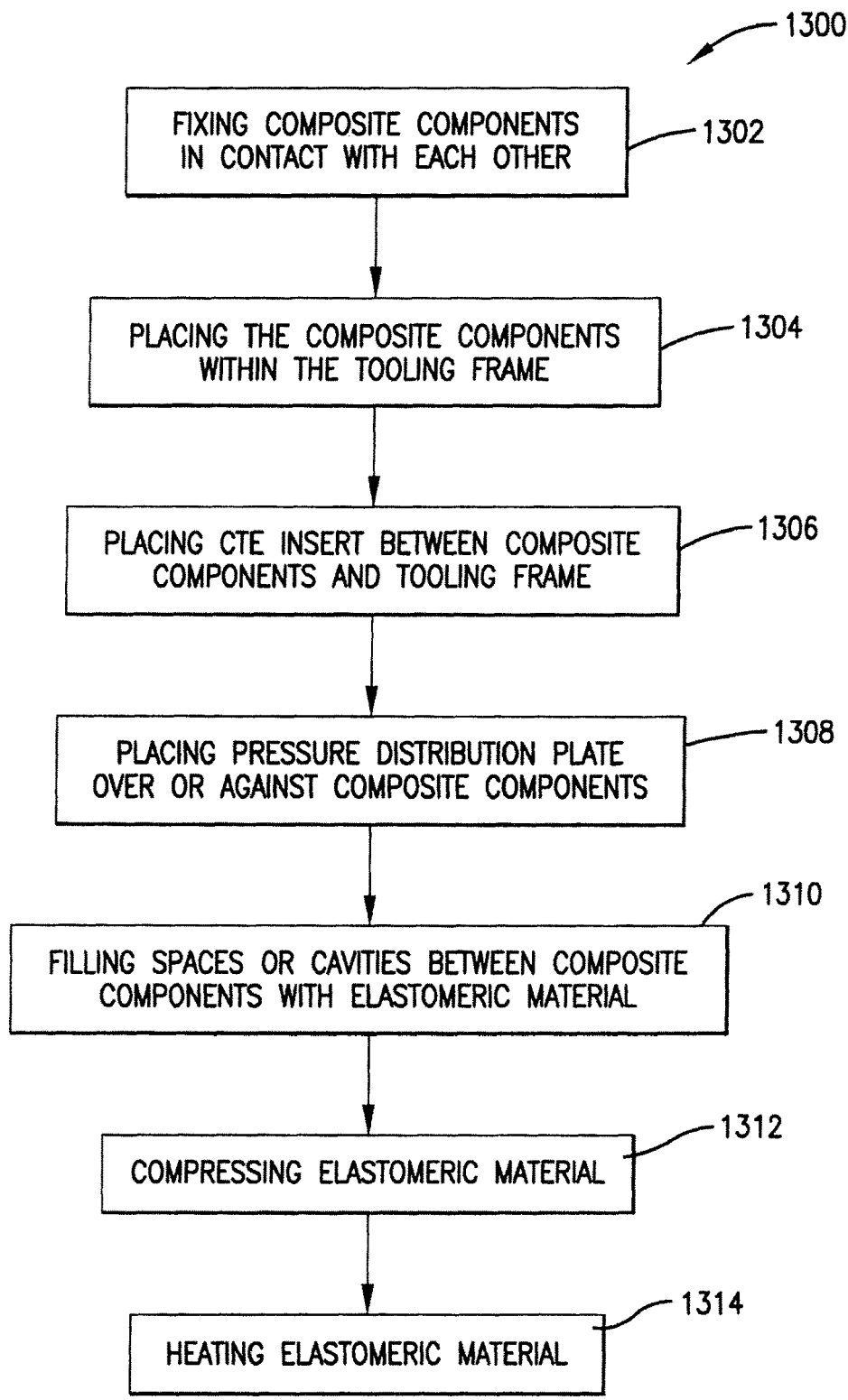

FIG. 12 is a cross-sectional schematic view of the bonded cascade assembly constructed in accordance with an alternative embodiment of the present invention, illustrating a pressure plate used for compression of elastomeric material; and FIG. 13 is a flow chart depicting steps in a method of bonding multiple components of a composite assembly in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention comprise a tooling assembly 10 and methods for fabricating cascade thrust reversers and other complex composite assemblies formed by bonding or joining a plurality of composite components together.

An embodiment of the tooling assembly 10 is shown in FIGS. 4-11 and includes a tooling frame 12, a pressure distribution plate 14, a pressure-inducing apparatus such as an impermeable membrane 16, and a flowable solid elastomeric material 18, such as granules of rubber or the like. In some embodiments of the invention, the tooling assembly 10 may also include a coefficient of thermal expansion (CTE) insert 20 to compensate for differences in CTE between the tooling frame 12 and components being bonded in the tooling assembly 10, as later described herein.

Figure 1:
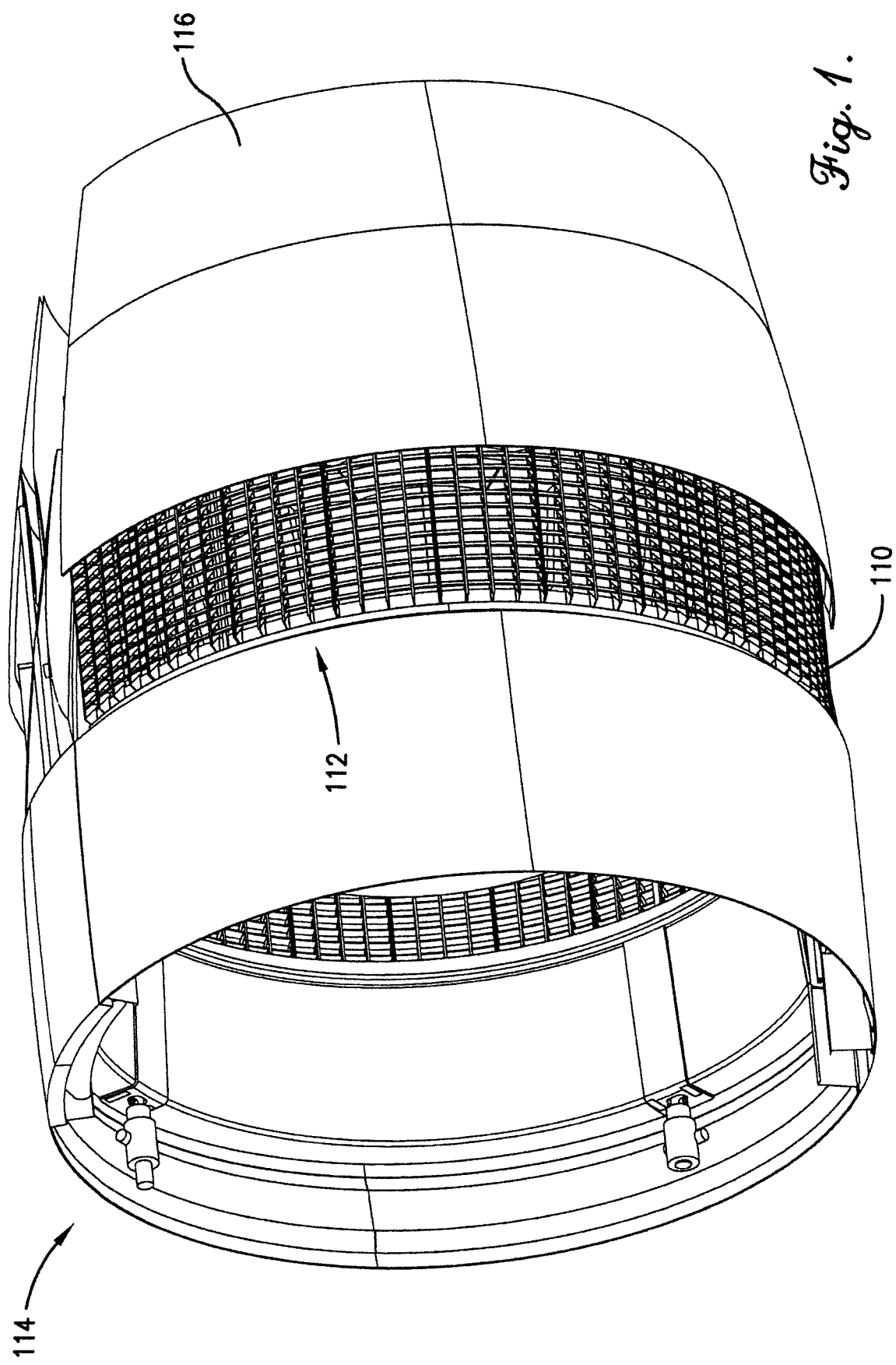
FIG. 1 is a perspective view of an aircraft nacelle having a thrust reverser with bonded cascade assemblies constructed in accordance with an embodiment of the present invention.

The tooling assembly 10 may be used in bonding multiple components of a composite assembly, particularly complex assemblies in which multiple parts have complex curvatures or cooperatively form semi-trapped geometries that would traditionally require custom vacuum bagging and/or custom bladders for traditional co-curing or co-bonding techniques. For example, the tooling assembly 10 may be used to form a bonded cascade assembly 110 of a thrust reverser 112 on an aircraft engine nacelle 114, as illustrated in FIG. 1. The bonded cascade assembly 110 may be disposed between a translating sleeve 116 and an engine (not shown) housed within the nacelle 114, and may have fore and aft ends 118,120 fixedly attached to fixed elements of the nacelle 114. As illustrated in FIG. 1, the thrust reverser 112 may have multiple bonded cascade assemblies 110, fabricated as described herein, which cooperatively circumscribe a fan exhaust duct of the nacelle 114. When the translating sleeve 116 is translated aftward, the bonded cascade assembly 110 may function to redirect air within the nacelle 114 in a generally outward and forward direction.

Figure 2:
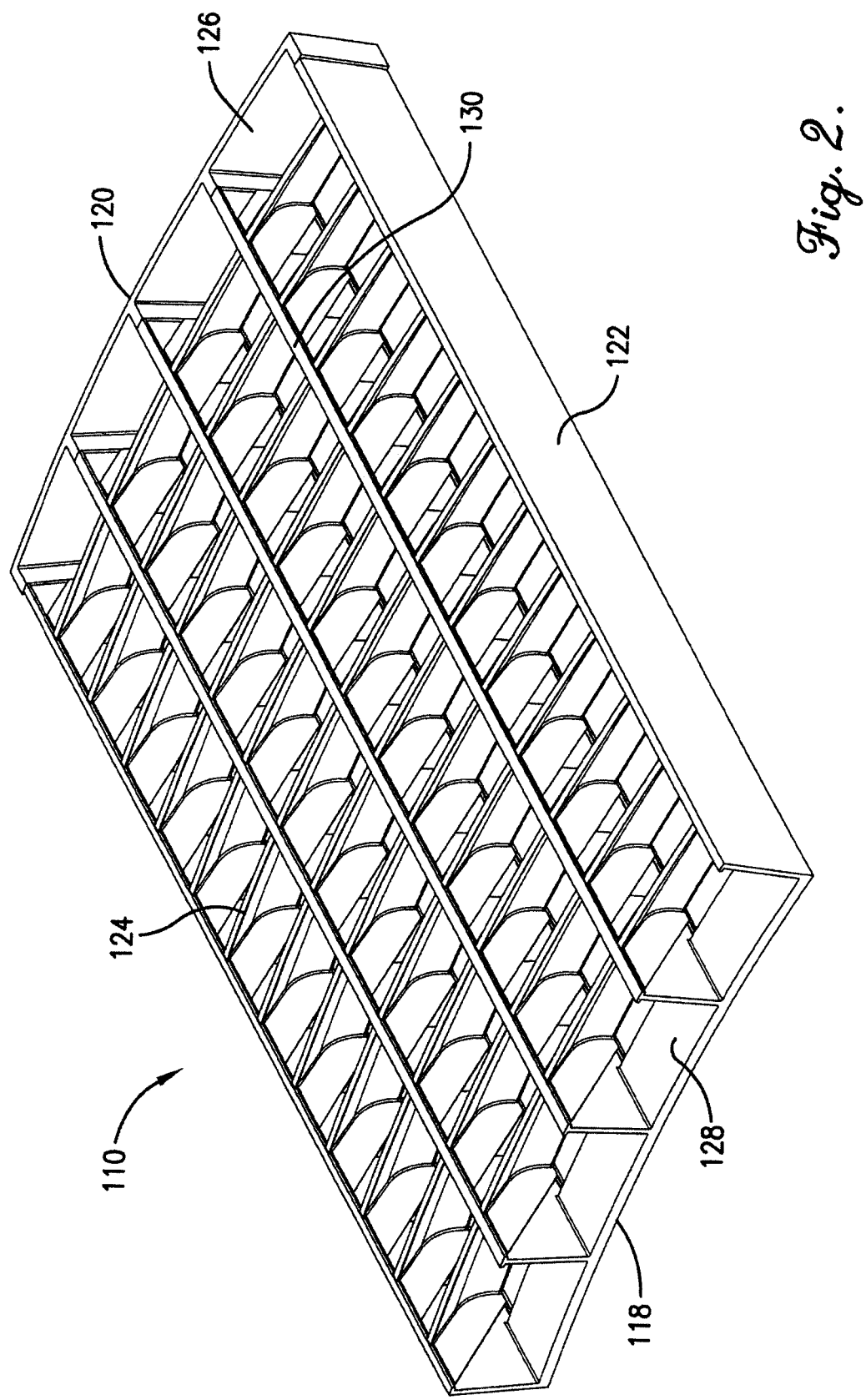
FIG. 2 is a perspective view of one of the bonded cascade assemblies of FIG. 1.
Figure 3:
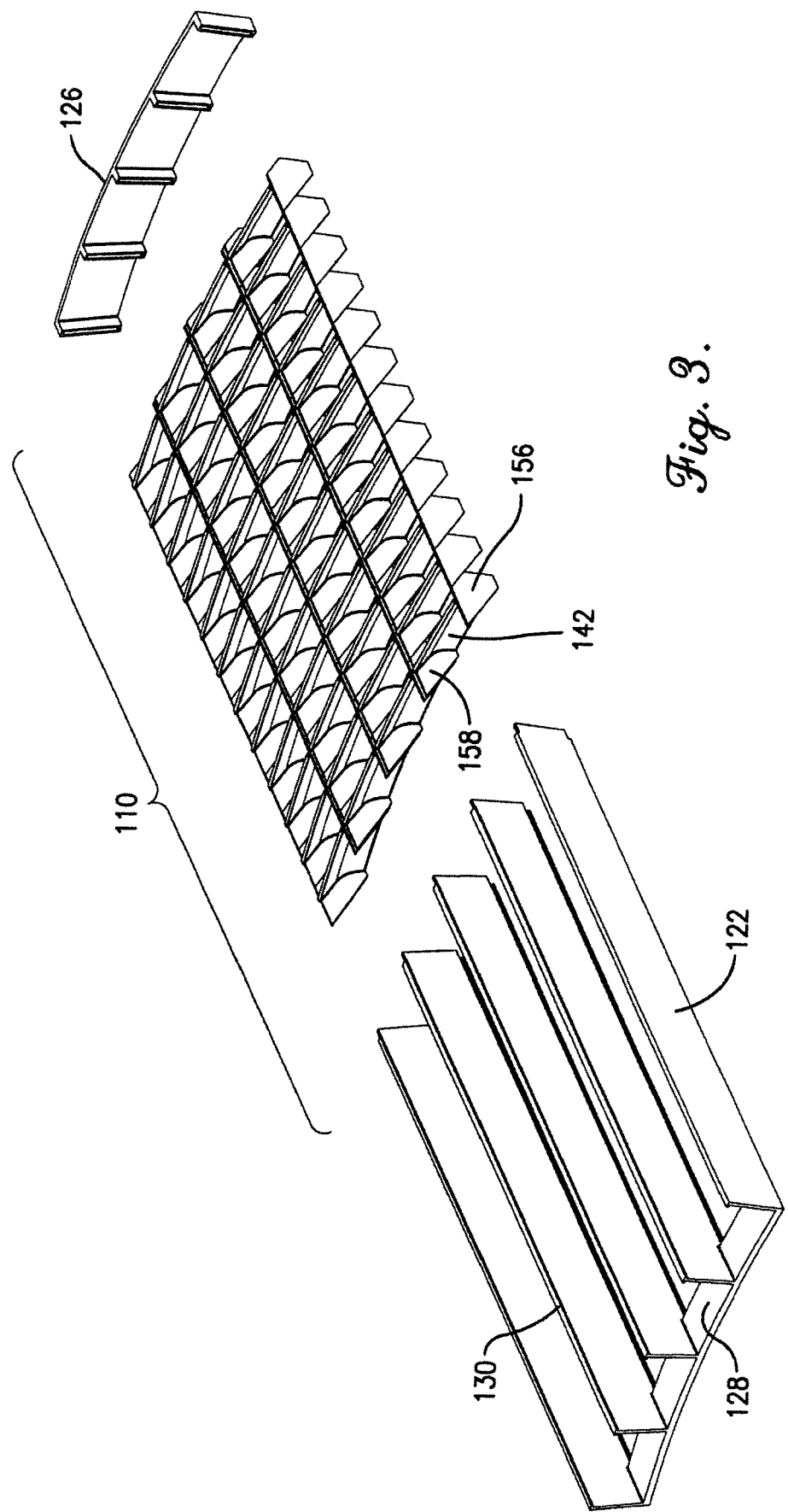
FIG. 3 is an exploded perspective view of one of the bonded cascade assemblies of FIG. 1.

As illustrated in FIGS. 2-3, the bonded cascade assembly 110 may comprise a structural frame 122, a plurality of turning vanes 124, and a closeout cap 126, identical or substantially equivalent to the bonded cascade assembly disclosed in U.S. patent application Ser. No. 14/305,444, incorporated by reference herein in its entirety. The structural frame 122, turning vanes 124, and closeout cap 126 may be formed of composite materials, such as those known in the art of aircraft manufacturing. The turning vanes 124 are arranged in a cascade configuration and secured to the structural frame 122 utilizing structural adhesive, as later described herein. The closeout cap 126 is bonded or fastened to an aft end of the structural frame 122. The structural frame 122 may comprise an elongated front frame piece 128 and a plurality of elongated stiffeners 130 extending afterward from the front frame piece 128 and integrally formed of one-piece construction therewith. Alternatively, the front frame piece 128 may be formed separately and attached or bonded to the elongated stiffeners 130. The turning vanes 124 may each comprise a flow-directing portion 142 slanted, curved, or otherwise configured for directing air from within the nacelle 114 in the forward and outward direction. The flow-directing portions 142 may extend between two positioning flanges 156,158 integrally formed at the opposing side edges of the flow-directing portion 142.

As illustrated in FIGS. 4-11, the tooling frame 12 of the tooling assembly 10 may be made of aluminum or other durable, rigid materials having a desired CTE. The tooling frame 12 may be shaped to substantially match a desired contour or curvature of the cascade assembly 110. Specifically, the tooling frame 12 may have a plurality of surfaces therein, including side walls, a front wall, an aft wall, and a bottom wall. The bottom wall may form a generally curved surface substantially corresponding to a curvature of the cascade assembly 110. The side walls may be formed at angles relative to the bottom wall that coincide with angles of the cascade assembly 110.

The tooling frame 12 may further include vane indexing protrusions 22 and/or heat transfer fins 24 integrally-formed with the bottom wall of the tooling frame 12. The indexing protrusions 22 may extend from the bottom wall of the tooling frame 12 and be spaced apart to properly locate the flow-directing portions 142 of the turning vanes 124. The indexing protrusions 22 are illustrated as individual square-shaped protrusions, but may be of any shape or configuration for holding the turning vanes 124 in a desired spacing without departing from the scope of the invention. Additionally or alternatively, indexing indentions or other indexing features may be formed into or attached to the bottom wall of the tooling frame 12.

The heat transfer fins 24 may have any shape extending upward from the bottom wall of the tooling frame 12 and may be spaced apart in locations that extend between the elongated stiffeners 130 and the turning vanes 124. The heat transfer fins 24 are illustrated as having a substantially rectangular cross-section with slanted or tapered top portion in order to avoid direct contact with the curvature of the flow-directing portions 142 of the turning vanes 124. However, other shapes and configurations may be used without departing from the scope of the invention. The heat transfer fins 24 extend upward from the bottom wall to maximize the amount of heat transferred to the elastomeric material 18 from the tooling frame 12 proximate to an upper edge or upper portion of the bonded cascade assembly 110.

In some alternative embodiments of the invention, the bottom wall of the tooling frame 12 may be omitted and a top wall may be added to the tooling frame 12 without departing from the scope of the invention. For example, the top wall may be generally curved to substantially correspond to a curvature of the cascade assembly 110 and may have some or all of the features described herein as extending from or formed into the bottom wall, such as the indexing protrusions 22 and/or the heat transfer fins 24. In general, the features and functions of the bottom wall may be incorporated into any of the walls of the tooling frame 12 without departing from the scope of the invention, depending on the configuration of the composite components being bonded according to the methods described herein. For example, indexing protrusions 22 and/or heat fins 24 may be incorporated into any wall of the tooling frame 12.

The pressure distribution plate 14 may be a plate made of aluminum or other durable, rigid materials having a desired CTE. The pressure distribution plate 14 may have a plurality of holes 26 formed therethrough, such that at least one of the holes 26 is positioned to align with a space or cavity formed between each of the turning vanes 124 and between each segment of the structural frame 122. The holes 26 preferably are sized and configured to allow free flow of the elastomeric material 18 therethrough. The pressure distribution plate 14 may also include one or more grooves 32, such as the longitudinal grooves illustrated in FIGS. 5, 6, and 8-11. These grooves 32 may assist in properly locating the pressure distribution plate 14 relative to the elongated stiffeners 130.

The impermeable membrane 16 may be made of a flexible, air-tight material such as plastic or other materials used in composite vacuum bagging techniques. The impermeable membrane 16 may have any size or shape sufficient to be sealed to the frame around a periphery of the cascade assembly 110 or other components being bonded within the tooling assembly 10. The impermeable membrane 16 may be sealed to the frame 12 using any sealant 34, adhesive, or sealing apparatus known in the art for creating an airtight seal between two components. The impermeable membrane 16 may also have a vacuum port 30 formed therethrough, through which air or gas may be removed in order to compress the impermeable membrane 16 toward the tooling frame 12, as later described herein.

The impermeable membrane 16 is primarily used to provide compression force or pressure to the pressure distribution plate 14 and/or the elastomeric material 18, as later described herein. However, other pressure-inducing methods or apparatuses may be used without departing from the scope of the invention, such as a pressure plate 228 illustrated in FIG. 12 and later described herein.

The flowable solid elastomeric material 18 may be any elastomeric material such as rubber or the like in a substantially flowable-solid form, such as granules, pellets, chunks, particles, or other forms of finely-divided solid elastomeric materials. Specifically, the granules or particles of elastomeric material 18 may each have any desired shape and size sufficient to fit within the holes of the pressure distribution plate 14. Individual granules or particles of the elastomeric material 18 may be larger than a bond line between components of the parts being bonded. For example, the individual granules or particles of the elastomeric material 18 are preferably larger in diameter or thickness than a bond line between the turning vanes 124 and the structural frame 122.

The CTE insert 20 may include one or more sheets or strips of material placed along side walls and end walls of the frame 12, to be positioned between the tooling frame 12 and the cascade assembly 110. Specifically, the CTE insert 20 may be made of a material sufficient to compensate for differences in CTE between the tooling frame 12 and components being bonded in the tooling assembly 10, such as the cascade assembly 110. For example, the tooling frame 12 may be made of aluminum and the cascade assembly 110 may be formed of graphite or various composite materials. Thus, the CTE insert 20 may be made of silicone, silicone sheet stock, Teflon, or other materials having a high CTE. However, some embodiments of the invention may omit the CTE insert 20 without departing from the scope of the invention.

A method of bonding composite components, such as the components of the bonded cascade assembly 110, may generally comprise forming the individual composite components, positioning the individual components together via adhesive or other attachment methods, and placing the assembled components together into the tooling assembly 10. Next, the pressure distribution plate 14 may be placed over the assembled composite components, and the elastomeric material 18 may be placed onto the pressure distribution plate 14 and made to flow through the holes thereof into cavities of the assembled composite components. Then the impermeable membrane 16 may be positioned to cover the elastomeric material and the distribution plate 14 and may be sealed to the tooling frame 12, and compressed under vacuum and/or autoclave pressure to press the elastomeric material 18 toward the frame. Furthermore, in some embodiments of the invention, the tooling assembly 10 may be heated, thereby causing the elastomeric material 18 to expand and create added pressure for bonding of the composite components together.

The flow chart of FIG. 13 depicts the steps of an exemplary method 1300 for fabricating the bonded cascade assembly 110. In some alternative implementations, the functions noted in the various blocks may occur out of the order depicted in FIG. 13. For example, two blocks shown in succession in FIG. 13 may in fact be executed substantially concurrently, or the blocks may sometimes be executed in the reverse order depending upon the functionality involved.

As illustrated in FIG. 13, the method 1300 of fabricating a bonded cascade assembly 110 may include the steps of fixing at least two composite components in contact with each other, as depicted in block 1302 and FIG. 2, and placing the composite components within the tooling frame 12, as depicted in block 1304 and illustrated in FIGS. 4-11. For example, the composite components may be the turning vanes 124 and the elongated stiffeners 130, as well as other composite components of the cascade assembly 110 described herein. However, the composite components may be any composite parts to be bonded, co-bonded, or co-cured to each other. The composite components may be components having complex contours and/or interlocking or partially-trapped geometries, in which traditional vacuum bagging for co-bonding or co-curing of composite components is often labor intensive.

Fixing the composite components to each other may include the use of epoxy or adhesive to form an initial attachment of the components prior to bonding, co-bonding, or co-curing. Additionally or alternatively, various removable mechanical clamps or devices may be used to temporarily hold the composite components together during bonding, co-bonding, or co-curing cycles. Locations at which the composite components meet and/or are attached via the epoxy or adhesive may be referred to herein as bondlines. Due to part variations and imperfections, some gaps at the bondlines between the composite parts may exist. However, granules or particles of the elastomeric material 18 must be sized larger than any spaces or gaps between the composite components at their bondlines.

Figure 5:
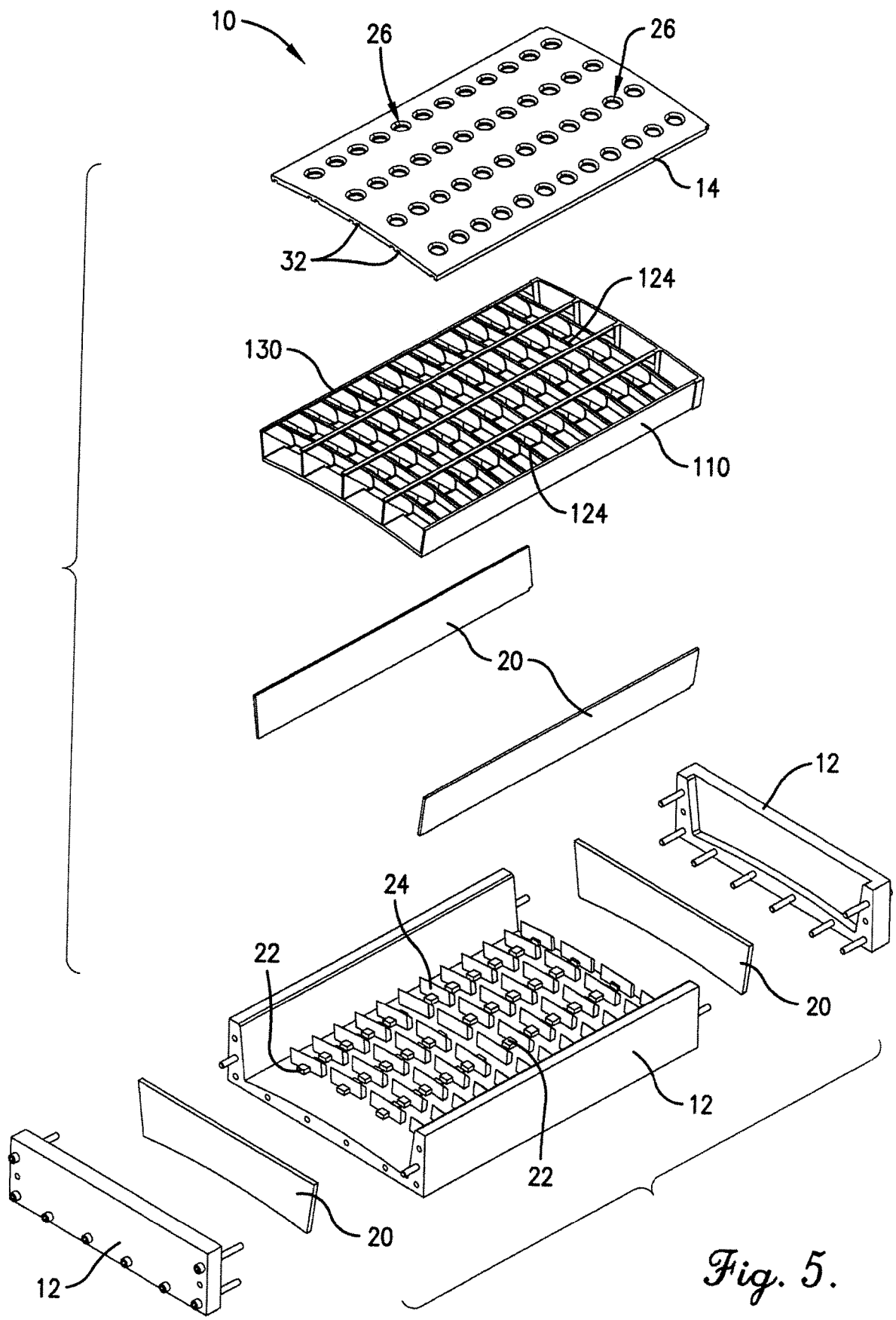
FIG. 5 is an exploded perspective view of the tooling assembly of FIG. 4.
Figure 6:
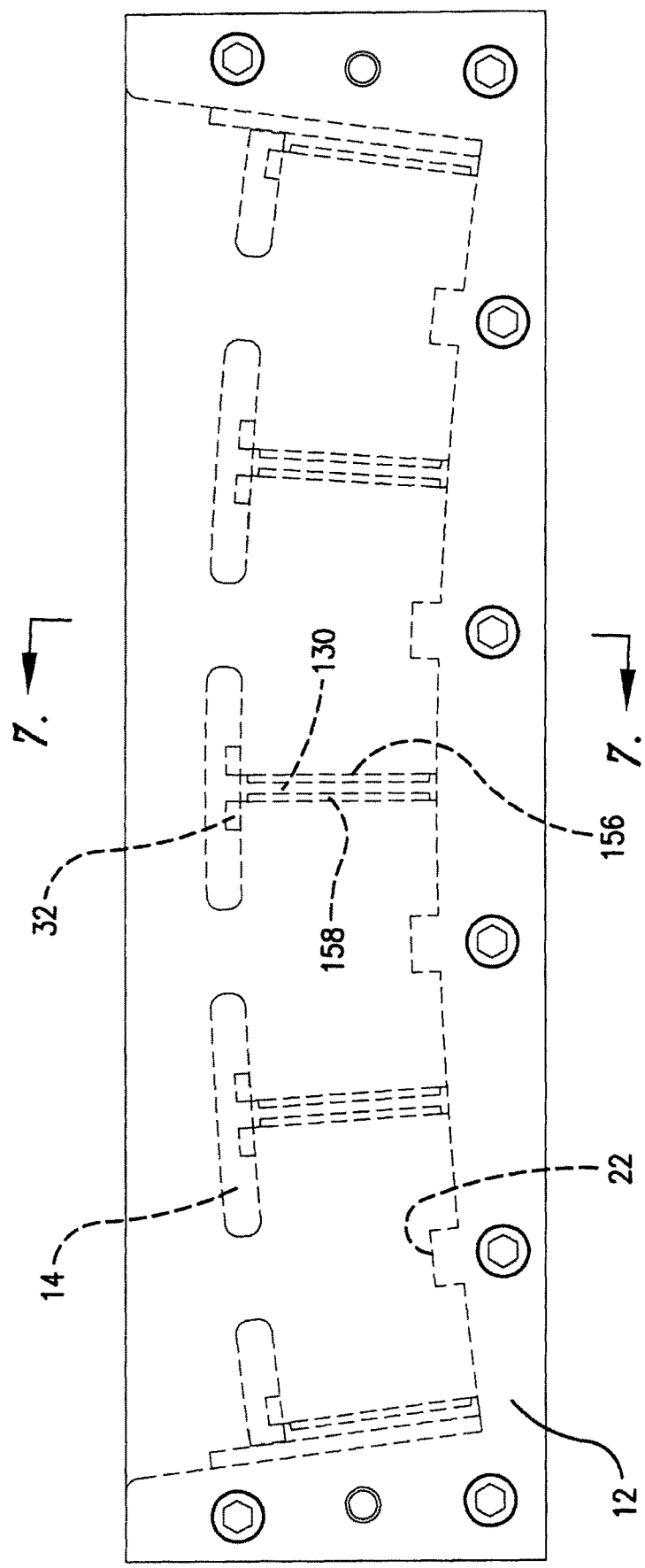
FIG. 6 is an end view of the tooling assembly of FIG. 1.
Figure 7:
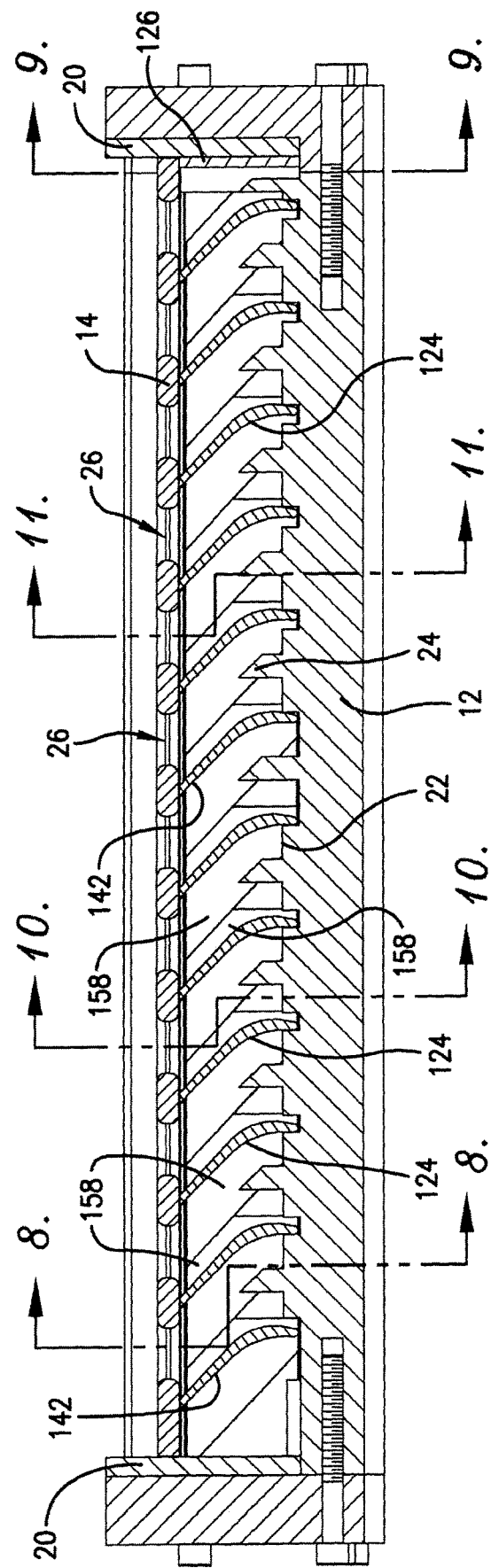
FIG. 7 is a cross-sectional view of the tooling assembly taken along line 7-7 in FIG. 6.
Figure 8:
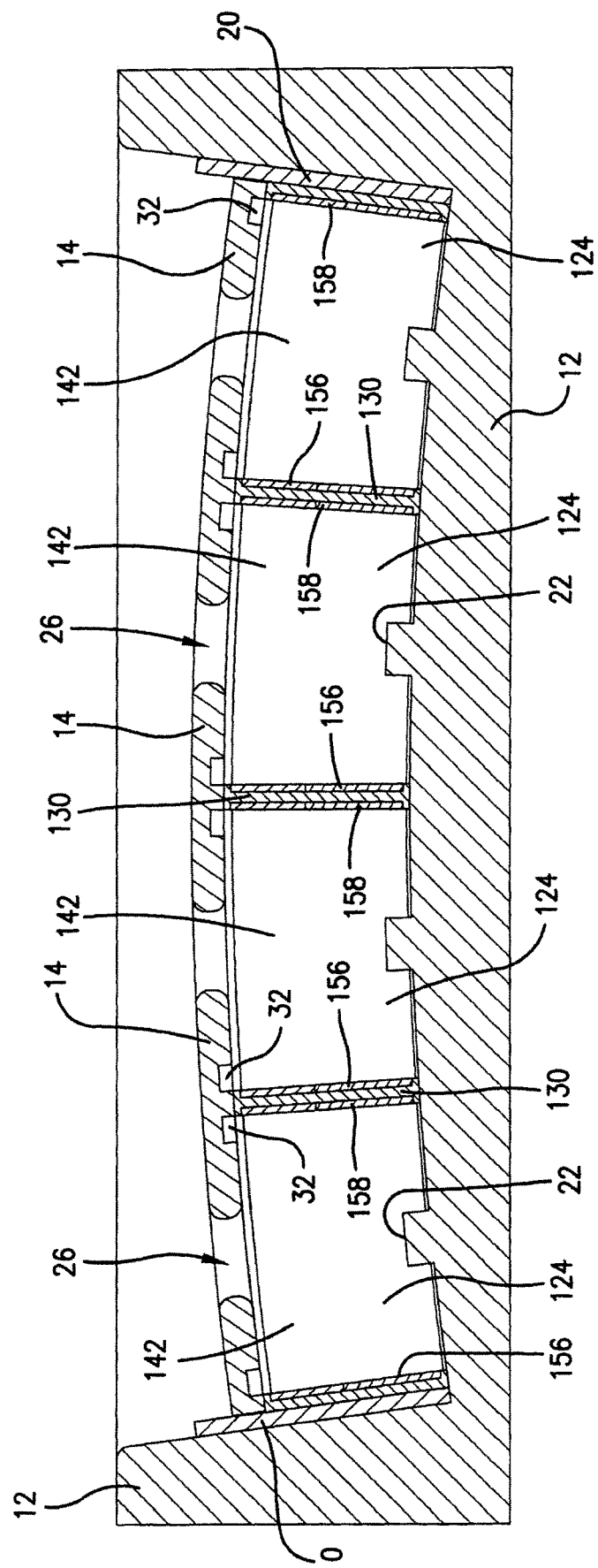
FIG. 8 is a cross-sectional view of the tooling assembly taken along line 8-8 in FIG. 7.
Figure 9:
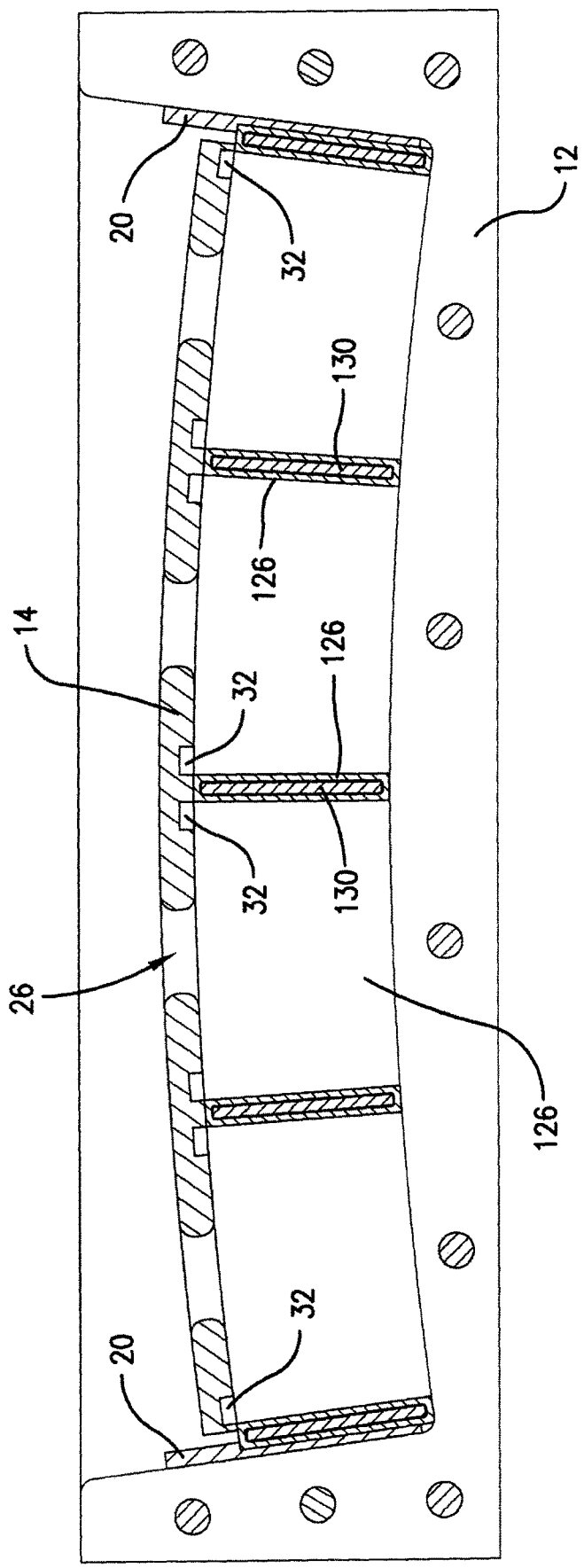
FIG. 9 is a cross-sectional view of the tooling assembly taken along line 9-9 in FIG. 7.
Figure 10:
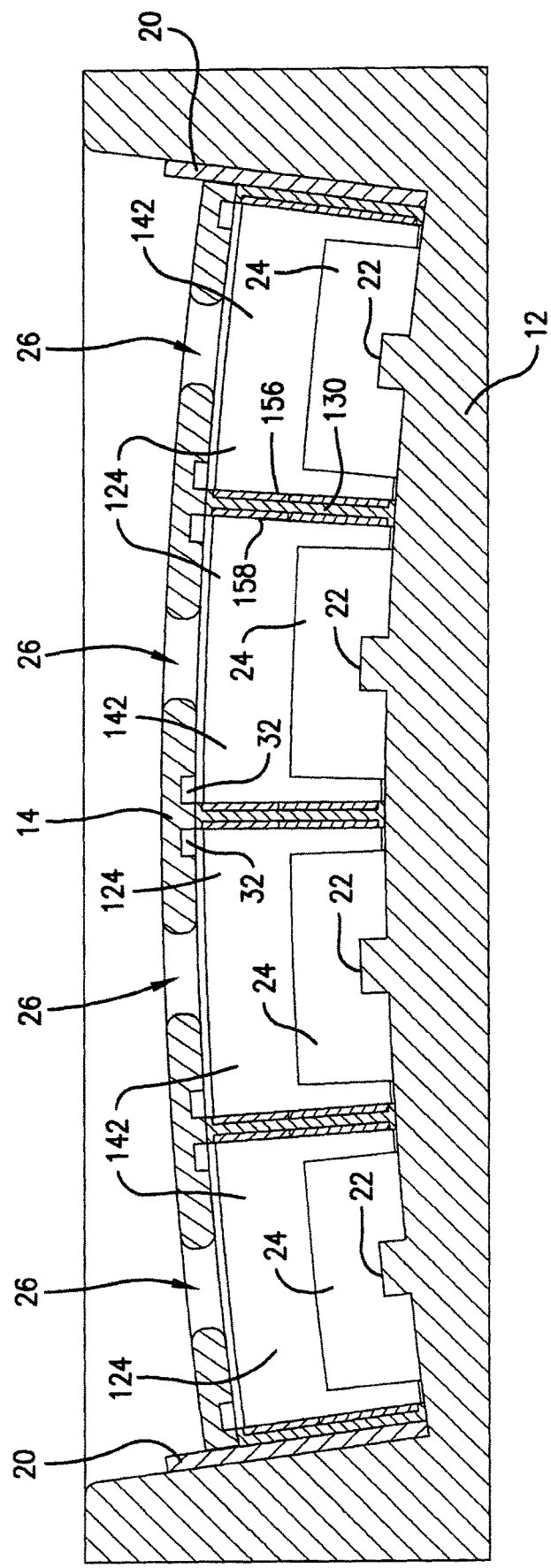
FIG. 10 is a cross-sectional view of the tooling assembly taken along line 10-10 in FIG. 7.
Figure 11:
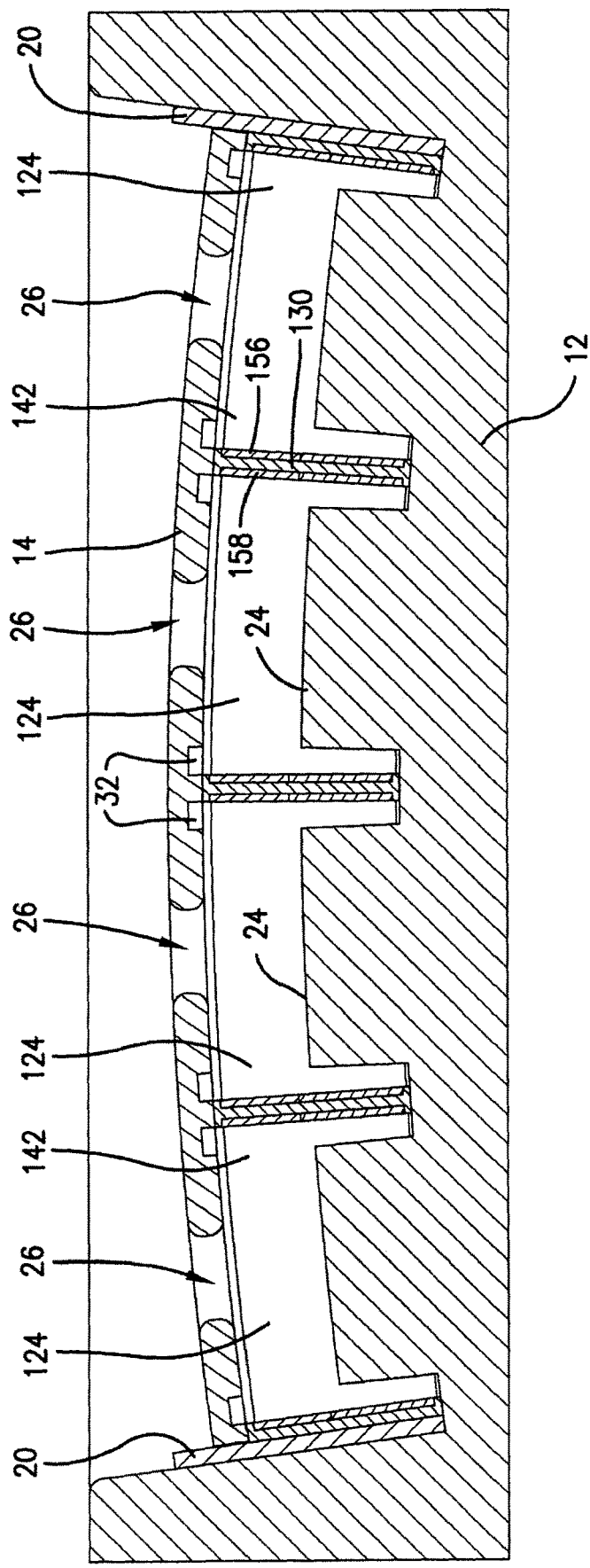
FIG. 11 is a cross-sectional view of the tooling assembly taken along line 11-11 in FIG. 7.

The tooling frame 12 may have a release agent placed thereon prior to placement of the composite components therein and/or caul sheets placed between the turning vanes 124 such that adhesive squeezed out from the bondline does not stick to the tooling frame 12. The tooling frame 12 may also require assembly and attachment of various walls or components thereof after insertion of the composite components therein. As illustrated in FIG. 5, the front wall and the aft wall may be mechanically attached to the side walls and the bottom wall of the tooling frame 12 using mechanical fasteners such as dowel pins and bolts. This attachment may occur before or after insertion of the composite components therein, with the front and aft walls serving as close-out caps for the tooling frame 12.

The method 1300 may also include a step of placing the CTE insert 20 between the composite components and the tooling frame 12, as depicted in block 1306. Specifically, the CTE insert 20 may include a plurality of CTE inserts covering the front wall, the aft wall, the side walls, and/or the bottom wall of the tooling frame. Some or all of the CTE inserts may be placed into the tooling frame 12 prior to step 1304 of placing the composite components into the tooling frame 12. However, in other embodiments of the invention, some of the CTE inserts may be placed into the tooling frame 12, between the tooling frame 12 and the composite components, after step 1304 without departing from the scope of the invention.

The method 1300 may also include a step of placing the pressure distribution plate 14 over or against the composite components, as depicted in block 1308. For example, the pressure distribution plate 14 may be placed on a top-edge of the turning vanes 124 and the elongated stiffeners 130, such that pressure is distributed more evenly during compressing and heating steps later described herein. Step 1308 and the pressure distribution plate 14 may be omitted without departing from the scope of the invention. The pressure distribution plate 14 may be aligned such that the holes 26 are aligned with the spaces or cavities between the turning vanes 124 and the elongated stiffeners 130, thus providing a path for the granules or particles of elastomeric material 18 to freely flow through the holes 26 into those spaces or cavities.

Figure 4:
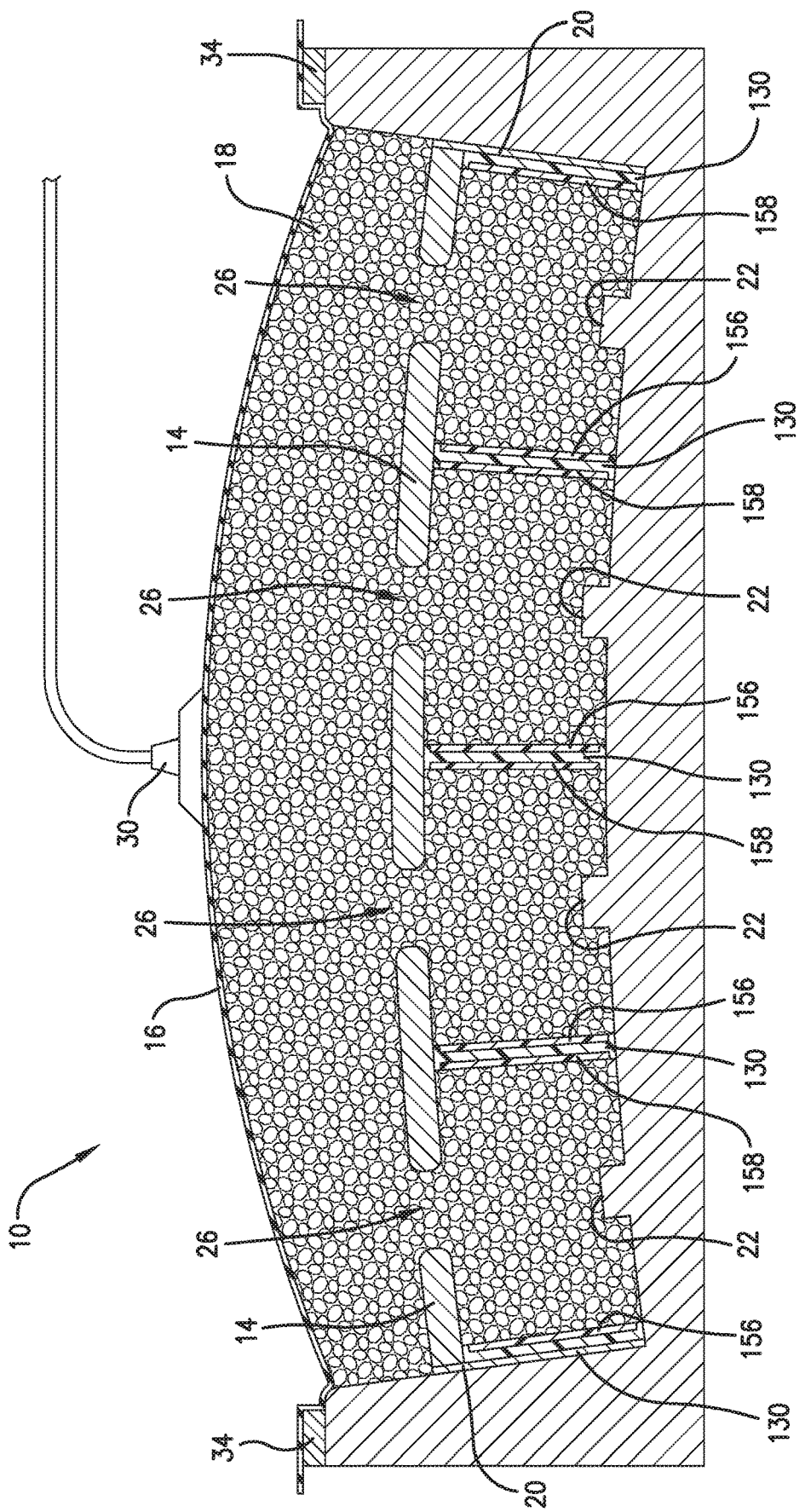
FIG. 4 is a cross-sectional schematic view of the bonded cascade assembly of FIG. 2, with portions thereof being bonded together via a tooling assembly constructed in accordance with an embodiment of the present invention

Next, the method 1300 may include a step of filling cavities or spaces between the composite components and the tooling frame 14 with the flowable solid elastomeric material 18, as depicted in block 1310. As illustrated in FIG. 4, granules or particles of the elastomeric material 18 may be poured over or otherwise pumped into the cavities or spaces between the turning vanes 124 and cavities or spaces between the elongated stiffeners 130, flowing through the holes 26 and then resting atop the pressure distribution plate once the cavities or spaces between the turning vanes 124 and the elongated stiffeners 130 are filled.

Then the method 1300 may include the steps of compressing the elastomeric material 18, as depicted in block 1312, and heating the elastomeric material 18, the composite components, and the tooling frame 12, as depicted in block 1314, causing compression and/or expansion of the elastomeric material 18 sufficient to press the composite components toward each other at their bondlines and causing the composite components to bond or co-bond to each other under pressure of the elastomeric material. Specifically, the impermeable membrane 16 may be pressed against the elastomeric material 18 piled on top of the pressure distribution plate 14, creating additional flow of the granules or particles of the elastomeric material 18 through the holes 26. The impermeable membrane 16 may be compressed under vacuum or other pressure differential techniques.

The pressure provided by the impermeable membrane 16 may cause the elastomeric material 18 to be compressed against the composite parts and/or the pressure distribution plate 14, increasing the pressure provided to the bondline. The heat may be provided by an autoclave, oven, or any heating technique known in the art for curing or bonding composite materials. The heat may also cause expansion of the elastomeric material 18, thereby increasing the pressure at the bondlines to assist in bonding, co-curing, or co-bonding of the composite components. However, in some embodiments of the invention, co-curing or co-bonding may occur without the addition of heat, such as in situations where room temperature adhesives are used during bonding.

Various temperatures and various pressure amounts may be used, depending on requirements for a particular application and/or for a particular adhesive used. In one example embodiment of the invention, an adhesive cure temperature of approximately 350° F. and a pressure of approximately 40 PSI may be used. In other embodiments of the invention, the adhesive cure temperature used may be between 300° F. and 400° F. and the pressure applied by the impermeable membrane 16 and/or the elastomeric material 18 may be between 30 PSI and 50 PSI. Other amounts of heat and pressure may be applied without departing from the scope of the invention.

In an alternative embodiment of the invention, a tooling assembly 210 may be used for bonding, co-bonding, or co-curing of composite parts as described above. As illustrated in FIG. 12, the tooling assembly 210 and its associated method of use may be substantially identical to that of the tooling assembly 10 and the method 1300 described above, including a tooling frame 212, a pressure distribution plate 214, a CTE insert 220, and a elastomeric material 218 that is substantially identical to the tooling frame 12, the pressure distribution plate 14, the CTE insert 20, and the elastomeric material 18 described above. However, the tooling assembly 210 omits the impermeable membrane 16, replacing this component with a plunger or a pressure plate 228. The pressure plate 228 may fit within side, front, and aft walls of the tooling frame 212 with a minimal clearance (such as 0.01 inches) and may be movable into and out of the tooling frame 212. The plunger or pressure plate 228 may be used to press the elastomeric material 218 in a direction toward the pressure distribution plate 214 and/or the tooling frame 212. The plunger or pressure plate 228 may be pressurized by way of a mechanical clamping device such as a piston, press, clamps, or the like.

In use, the plunger or the pressure plate 228 may be mechanically and/or manually forced in a direction toward the elastomeric material 218 and/or the pressure distribution plate 214. For example, the pressure plate 228 or plunger may be pressurized by way of the mechanical clamping device described above. The pressure provided by the plunger or the pressure plate 228 may cause the elastomeric material 218 to be compressed against the composite parts and/or the pressure distribution plate 214, increasing the pressure applied to the bondlines. If the expansion of the elastomeric material 218 under cure heat creates more pressure than the pressure plate 228 or its mechanical clamping device can withstand, the clamps or press thereof may deform, limiting pressure to whatever the mechanical clamping device was designed to provide. Springs may also be used on the mechanical clamping device to limit the pressure provided.

Advantageously, the substantially flowable solid elastomeric material 18, which may also expand under heat, provides bonding pressure without the need for complicated bagging arrangements, and is easily removed from within cavities, complex contours, or semi-trapped geometries once returned to a cooler temperature after bonding or co-bonding of the composite parts. Advantageously, the distribution plate 14 and the holes 26 advantageously allow uniform flow between spaces or cavities of the composite parts such that the cavities can all have similar pressures. The pressure drop through the holes 26 may also cause provide clamping forces between the composite parts and the tooling frame 12, so that the composite parts are substantially fixed in place on and held to the contours of the tooling frame 12 during pressurization and bonding cycles.

The apparatus and methods described herein may be used for bonding with almost any complex composite assembly that is not suited for a bladder or other pressurized bags. Although described herein for use in adhesive bonding, the apparatus and methods described herein may be utilized in other curing or forming processes, even if no bonding is to occur. For example, if forming and/or curing a single-piece part, cavities or bays of the single-piece part can be filled with the flowable solid elastomeric material 18 to prevent a pressure differential with adjacent cavities or bays during curing thereof.

In some embodiments of the invention, the composite components may be assembled together without any adhesive initially present, and liquid adhesive may be subsequently introduced into interface regions between the assembled composite components by means of pressurized injection, vacuum infusion, or the like. If liquid adhesive is introduced in this manner, it may be done after the step of compressing the flowable solid elastomeric material 18 (step 1312), so that any space between adjacent granules of the elastomeric material 18 is substantially eliminated, and any cavities formed within or between the composite components are substantially filled, making them inaccessible to the liquid adhesive that might otherwise rush into such cavities. The adhesive used, whether injected or applied in solid form at the time of assembly, may be elastomeric, may be selected to have a relatively high elongation and relatively low modulus, and may preferably be acrylic or polyurethane. Adhesive with these characteristics may be particularly suitable for bonding structures in accordance with the methods of the present invention.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of bonding multiple components of a composite assembly, the method comprising:
   placing at least two composite components in contact with each other;
   placing a pressure distribution plate with holes formed therethrough over at least a portion of the composite components;
   filling cavities formed within or between the composite components with flowable solid elastomeric material by flowing the flowable solid elastomeric material through the holes formed in the pressure distribution plate;
   compressing the elastomeric material, causing flow of the flowable solid elastomeric material to increase pressure applied by the elastomeric material against the composite components, thereby pressing the at least two composite components toward each other, causing the composite components to bond to each other under pressure of the elastomeric material; and
   separating the pressure distribution plate from the portion of the composite components after the compressing step.

2. The method of claim 1, further comprising placing the composite parts within a tooling frame prior to the step of filling the cavities with the elastomeric material.

3. The method of claim 1, wherein at least one of the holes of the pressure distribution plate is aligned with at least one of the cavities.

4. The method of claim 1, wherein the step of compressing the elastomeric material includes placing an impermeable membrane over the elastomeric material and sealing the impermeable membrane, then compressing the impermeable membrane toward the elastomeric material via application of a pressure differential.

5. The method of claim 1, wherein the step of compressing the elastomeric material includes pressing a plunger or plate against the elastomeric material in a direction toward the composite components and the tooling frame.

6. The method of claim 2, further comprising placing a coefficient of thermal expansion (CTE) insert between at least one of the composite components and the tooling frame to compensate for differences in coefficients of thermal expansion between the tooling frame and the composite components, wherein the CTE insert is made of a different material than the tooling frame and the composite components.

7. The method of claim 1, wherein the step of fixing the composite components in contact with each other further comprises attaching at least one of the composite components to another one of the composite components using adhesive prior to the step of filling the cavities with the elastomeric material.

8. A method of bonding multiple components of a bonded cascade assembly of an aircraft nacelle, the method comprising:
   fixing a plurality of turning vanes between a plurality of elongated stiffeners with adhesive, wherein the turning vanes and the elongated stiffeners are made of composite material;
   placing the turning vanes and the elongated stiffeners within a tooling frame;
   placing a pressure distribution plate with holes formed therethrough over at least a portion of the turning vanes and the elongated stiffeners;
   filling cavities formed between the turning vanes and the elongated stiffeners with solid granules or particles of elastomeric material, wherein the holes in the pressure distribution plate are large enough to allow the granules or particles of the elastomeric material to flow therethrough and into the cavities during the step of filling the cavities with the elastomeric material;

compressing and heating the elastomeric material, the turning vanes, the elongated stiffeners, and the tooling frame, the compressing causing the elastomer to exert hydrostatic pressure sufficient to press contacting portions of the turning vanes and the elongated stiffeners toward each other and causing the turning vanes to bond to the elongated stiffeners under pressure provided by the elastomeric material; and separating the pressure distribution plate from the portion of the turning vanes and the elongated stiffeners after the compressing and heating step.

9. The method of claim 8, wherein at least one of the holes of the pressure distribution plate is aligned with one of the cavities.

10. The method of claim 8, wherein the step of compressing the elastomeric material includes placing an impermeable membrane over the elastomeric material and sealing the impermeable membrane to the tooling frame, then compressing the impermeable membrane toward the tooling frame and the elastomeric material via application of a pressure differential.

11. The method of claim 8, wherein the step of compressing the elastomeric material includes pressing a plunger or plate against the elastomeric material in a direction toward the turning vanes, the elongated stiffeners, and the tooling frame.

12. The method of claim 8, further comprising placing a coefficient of thermal expansion (CTE) insert between at least one of the elongated stiffeners and the tooling frame to compensate for differences in coefficients of thermal expansion between the tooling frame and the elongated stiffeners, wherein the CTE insert is made of a different material than the tooling frame and the elongated stiffeners.

13. The method of claim 8, wherein the turning vanes include two positioning flanges and a flow directing portion extending between the positioning flanges, wherein locations at which the positioning flanges contact the elongated stiffeners are bondlines, wherein the elastomeric material comprises granules or particles larger in diameter, thickness, or volume than a maximum space between the positioning flanges and the elongated stiffeners at the bondlines.

14. The method of claim 8, wherein the step of heating involves heating the elastomeric material to a curing temperature of the adhesive.

15. The method of claim 8, wherein the tooling frame comprises a plurality of heat transfer fins extending into the cavity formed by the tooling frame, wherein the turning vanes are positioned such that one or more of the heat transfer fins extend between two of the turning vanes placed into the tooling frame.

* * * * *